US006289287B1

(12) United States Patent
Meng et al.

(10) Patent No.: US 6,289,287 B1
(45) Date of Patent: Sep. 11, 2001

(54) IDENTIFICATION OF SAMPLE COMPONENT USING A MASS SENSOR SYSTEM

(75) Inventors: Chin-Kai Meng, Hockessin, DE (US); Roger Firor, Landenberg, PA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/240,217

(22) Filed: Jan. 29, 1999

(51) Int. Cl.[7] ............................ G01N 31/00; G06F 19/00

(52) U.S. Cl. ............................................... 702/23; 73/23.2

(58) Field of Search ................................. 702/23, 24, 25; 73/23.2, 23.35, 23.36, 23.37, 23.41

(56) References Cited

U.S. PATENT DOCUMENTS

| | | | |
|---|---|---|---|
| 4,008,388 | 2/1977 | McLafferty et al. . | |
| 4,075,475 | 2/1978 | Risby et al. . | |
| 4,084,090 | 4/1978 | Boettger et al. . | |
| 4,314,156 | 2/1982 | Kuppermann et al. . | |
| 4,573,354 | 3/1986 | Voorhees et al. . | |
| 5,218,529 | 6/1993 | Meyer et al. . | |
| 5,243,282 | 9/1993 | Miller, III et al. . | |
| 5,412,207 | 5/1995 | Micco et al. . | |
| 5,545,895 | 8/1996 | Wright et al. . | |
| 5,710,713 | 1/1998 | Wright et al. . | |
| 5,744,702 | 4/1998 | Roussis et al. . | |
| 5,970,804 * | 10/1999 | Robbat, Jr. ......................... | 73/863.12 |
| 6,107,627 * | 8/2000 | Nakagawa et al. .................. | 250/292 |

FOREIGN PATENT DOCUMENTS

| | | |
|---|---|---|
| WO 96/42058 | 12/1996 | (WO) . |
| WO 98/09148 | 3/1998 | (WO) . |

OTHER PUBLICATIONS

Pirouette Manual, "Multivariate Data Analysis for Windows 95/98 and NT" Version 2.5. Copyright 1985–1998 by Infometrix, Inc., pp..i—18–30.

Application Note: Wolf Muenchmeyer, Andreas Walte, "Fast Analysis of Complex Mixtures with Membrane Inlet Mass Spectrometry and Neural Networks," WMA Airsense Analysentechnik GmbH.

B. Dittmann, S. Nitz and G. Horner:"A new chemical sensor on a mass spectrometric basis," Advances in Food Sciences (Adv. FoodSci. (CMTL)) vol. 20, No. 3/4, pp. 69–121, May 1998.

C. Kai Meng, Philip L. Wylie, and Cynthia Cai, "Classifying Citrus Products With A Chemical Sensor," Chemical Sensor Technology, Food Testing & Analysis, Oct.–Nov. 1998, pp. 17–18.

(List continued on next page.)

*Primary Examiner*—Patrick Assouad
*Assistant Examiner*—Demetrius Pretlow

(57) ABSTRACT

Disclosed is a method of identifying an anomalous sample in a group of complex samples. The method provides vapor phase molecules from each complex sample to a mass sensor to derive a mass spectrum representative of each of the complex samples. Further, the method provides all of the mass spectra to a computer in a data matrix. The method performs exploratory data analysis on the data matrix using at least one set of principal components and performs a classification analysis of such matrix using a soft independent modeling of class analogy technique to select masses exhibiting high discrimination power. The method performs a mass correlation analysis with the selected masses to determine at least three correlated masses. A comparison of the three correlated masses is made to a library of mass spectra to identify at least one candidate that is potentially indicative of the anomalous sample. A review is made of the one or more candidates to identified the anomalous sample.

4 Claims, 13 Drawing Sheets

OTHER PUBLICATIONS

"Fast Answers, Without a Doubt" Copyright 1998 by Hewlett–Packard Company, Publication No. (23) 5966–4190E.

"The HP 4440 Primer" Copyright Hewlett–Packard Company 1998, Part No. G2702–90100.

H. Troy Nagle, Susan S. Schiffman, Ricardo Gutierrez–Osuna, "The How and Why of Electronic Noses" IEEE Spectrum, Sep. 1998, pp. 22–34.

"Chemometrics in Chromatography," Chemometrics Applications Overview, Copyright 1996 Infometrix, Inc.

"Description of Pirouette Algorithms,"Chemometrics Technical Note, Copyright 1993 Infometrix, Inc.

Application Note: "Nuero –MS," WMA Airsense, Analysentechnik GmbH.

* cited by examiner

IDENTIFICATION OF SAMPLE COMPONENT USING A MASS SENSOR SYSTEM

FIELD OF THE INVENTION

The present invention relates to sample analysis systems and, more particularly, to a system for analyzing a plurality of complex samples to classify those complex samples and to determine the identity of an unknown sample component in one of such complex samples.

BACKGROUND OF THE INVENTION

Data representative of a plurality of complex samples is generated by modern instruments for use in a wide variety of quantitative and qualitative data analyses. Often, at least two goals can be identified for such data analysis: (1) comparing one or more samples to a standard having a known, or approved, composition so as to classify each sample; and with regard to a sample that has been classified, (2) providing an accurate identification of the component(s) in a sample that caused such sample to be classified as a differentiated, or anomalous complex sample.

To accomplish these goals, modem pattern recognition techniques are sometimes used to interpret the data. The purpose of such pattern recognition is usually to aid in classification of the sample (e.g., Is the sample of acceptable quality? Is the sample consistent with a previous run?) The advent of pattern recognition software has simplified methods development and automated the routine use of robust pattern matching in chromatography and similar analytical methods.

The field of study which encompasses this type of pattern recognition technology is called chemometrics. For example, a mass spectrogram or a chromatogram can be thought of as a data matrix representative of a "chemical fingerprint" wherein a pattern can emerge from the relative intensities of the sequence of peaks in the data matrix. Chromatographic fingerprinting, whether interpreted by human intervention or automated pattern recognition in software, has been used to infer a property of interest (typically adherence to a performance standard); or to classify the sample into one of several categories (good versus bad, Type A versus Type B, etc.).

Some examples of the use of chemometrics to problems in chromatographic pattern recognition, with applications drawn from different industries are as follows: In the food and beverage industry, sensory evaluation is sometimes coupled with instrumented analysis to classify samples according to geographical/varietal origin, for competitor evaluation, for determining a change in process or raw material or similar constituents, and in general for quality control and classification. In the medical and clinical industries, improved data analysis is required for identification of microbial species by evaluation of cell wall material, cancer profiling and classification, and for predicting disease states. For example, a prime concern of clinical diagnosis is to classify disorders rapidly and accurately and techniques have been applied to chromatographic data to develop models allowing clinicians to distinguish among disease states based on the patterns in body fluids or cellular material. In the field of environmental monitoring, improved data systems are now required for the evaluation of trace organics and pollutants, for performing pollution monitoring where multiple sources are present; and for effective extraction of information from large environmental databases.

Furthermore, instrumentation for carrying out gas chromatographic and mass spectrometric analyses are well known in the art for identifying one or more specific chemical components of a sample mixture. For example, chromatography is a method of analyzing a sample comprised of several components to qualitatively determine the identity of the sample components as well as quantitatively determine the concentration of the components.

Some of the above-described approaches have been successful in achieving an accurate comparison of a plurality of samples to a standard having a known, or approved, composition so as to classify each sample; others of the above-described approaches have been successful in identifying a specific chemical component of a sample mixture. However, none of the above-described approaches have been completely successful achieving both of the above-described data analysis goals in the one integrated methodology, namely, the integration of: a comparison of a plurality of samples to a standard having a known, or approved composition so as to classify each sample; and providing an accurate identification of the component(s) present in a classified sample that caused the sample to be classified as anomalous.

Accordingly, there is a need for an integrated method for achieving not only classification of a plurality of complex samples, but also for providing an accurate identification of the component(s) present in a sample that caused that sample to be classified as anomalous.

SUMMARY OF THE INVENTION

According to the present invention, a method may be carried out for classifying a complex sample and for identification of an anomalous sample component in a complex sample, wherein the complex sample is provided in a group of complex samples. The method includes the steps of: providing the group of complex samples to a sampler; sampling a quantity of each of the complex samples so as to provide a respective quantity of vapor phase molecules of the respective complex sample to a mass sensor; deriving a mass spectrum representative of the masses in each of the complex samples analyzed by the mass sensor, so as to generate a plurality of mass spectra; providing the mass spectra to a computer in a data matrix; performing an exploratory data analysis of the data matrix using at least one set of principal components; performing a classification method analysis using a soft independent modeling of class analogy (SIMCA) technique, wherein the masses exhibiting a high discriminating power are selected; performing, with use of each of the selected masses that exhibit a high discrimination power, a mass correlation analysis with respect to each selected mass so as to determine a set of at least three correlated masses; comparing each of the three correlated masses to mass spectra in a mass spectra library so as to identify at least one candidate mass spectrum that is associated with the correlated masses and which is potentially indicative of a respective differentiating sample component; reviewing the candidate mass spectrum to select the differentiating sample component that is associated with the correlated masses; and identifying the selected differentiating sample component.

Figure 1:
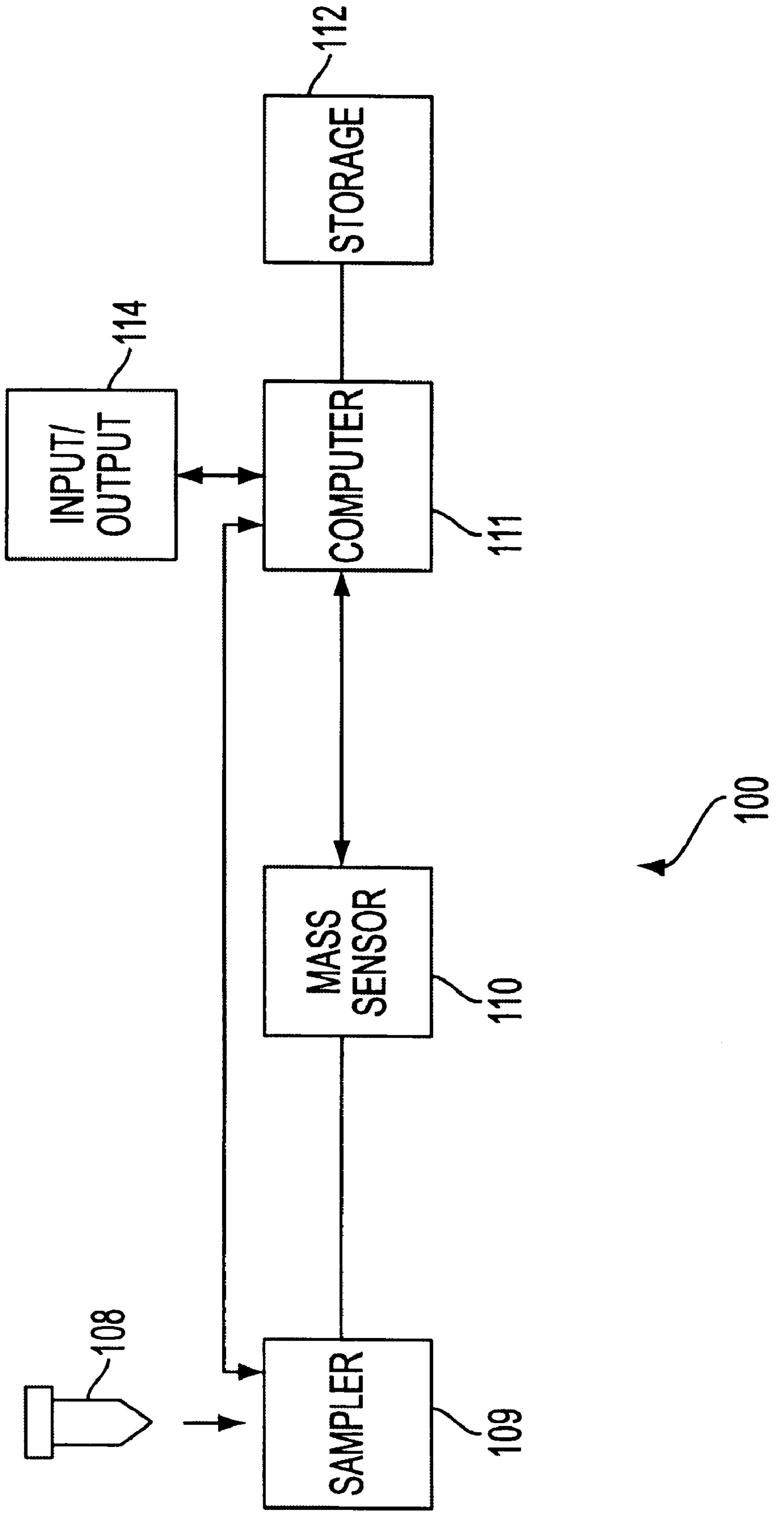
FIG. 1 is a simplified schematic representation of a mass sensor system constructed according to the present invention.

In the drawings and in the following detailed description of the invention, like elements are identified with like reference numerals. Note that the term "mass-to-charge ratio" may be considered herein to be interchangeable with the term "m/z ratio"; both of these terms have been shortened to "mass" for ease of description herein. Note that, for the purpose of clarity in illustration, FIGS. 3–14 include illustrations that are representative of the results of an exemplary experimental data analysis performed according to the present invention; in actual practice, the actual data, plots, and other representations of the results of and actual data analysis will vary from those illustrated.

DETAILED DESCRIPTION OF THE PREFERRED EMBODIMENTS

The method of the present invention may be employed to improve the identification of a variety of sample components present in a complex sample. Such a quantity of sample may occur in the form of a gas, liquid, a multiple component gases or liquid, or a mixture thereof.

A preferred embodiment of a mass sensor system 100 constructed according to the present invention is illustrated in FIG. 1. The system 100 is useful for analysis of a plurality of samples each provided in a respective sample container 108. The system 100 includes a sample introduction means 109, a mass sensor apparatus 110, a computer 111, an information input/output means 114, and an information storage means 112. Preferably, the output signal of the mass sensor 110 is provided in the form of a data matrix to be analyzed by the computer 111 with use of a novel sample component identification method described herein that is based on multivariate data analysis, with the ultimate analytical results, i.e., the subsequent identification of the sample component of interest, being reported to the operator by way of the input/output means 114, the storage means 112, or by suitable devices known in the art.

The computer 111 may include one or more computing devices amenable to the practice of this invention, e.g., one or more computing devices such as microprocessors, microcontrollers, switches, logic gates, or any equivalent logic device capable of performing the computations described hereinbelow. The input/output means 114 preferably includes a keyboard, keypad, or computer mouse, or network connection to a remote processor (not shown) for transfer of operating condition parameters, analytical data and results, system data, and the like. Information input/output means 114 may include display means such as an alphanumeric or video display, a printer, or similar means. The preferred computer 111 may have the storage means 112 integrated therein, such that the storage means 112 is provided in the form of volatile and non-volatile memory devices in which input and output information, operating condition parameters, system information, and programs can be stored and retrieved. Operating commands, device and sample type information, mass sensor response attributes, data libraries, multivariate data analysis programs, and other information necessary to perform the analysis described herein may be transferred to and from the computing means 111 by way of the input/output means 114 or the storage means 112. Messages prompting the operator to enter certain information, such as a desired operating parameter or analytical step can be generated by the processor 111 and displayed on the input/output device 114. The system 100 may further comprise other devices (not shown) such as a stand-alone power system, network and bus system (input/output or I/O) controllers, isolation devices, data and control interface cards, remote telemetry electronics, and other related electronic components for performing control, data processing, and communication tasks beyond those described herein, as known in the art.

A preferred embodiment of the system 100 is commercially available as an integrated instrument in the form of the HP 4440A Chemical Sensor from Hewlett-Packard Co., Wilmington, DE. The HP 4440A Chemical Sensor includes a sampler 109 provided in the form of a modified headspace sampler (e.g., a Hewlett-Packard 7694 Automated Headspace Autosampler) that is coupled directly to a mass sensor 110 provided in the form of modified mass selective detector (e.g., a Hewlett-Packard 5973 Mass Selective Detector). Computer 111 preferably is provided in the form of a personal computer such as a Hewlett-Packard Vectra XA Series desktop computer coupled to the mass sensor 110.

The sample container 108 is preferably a 10 or 20 ml vial. The HP 4440A chemical sensor can accommodate a group of up to 44 of such sample containers for unattended operation. Because there is no separation or quantitation involved in the analysis and because the mass sensor 110 is capable of fast scanning, it is possible to obtain results and to run subsequent samples about every three minutes. Virtually any sample that fits into an appropriate sample container 108 and produces a volatile when heated is suitable for the illustrated sampling technique. The Hewlett-Packard 7694 Automated Headspace Autosampler provides a constant heating time for each sample to assure good reproducibility. Of course, the present invention contemplates the use of other embodiments of the sampler 109 known to those skilled in the art, including, but not limited to, devices such as: liquid sample introduction using a membrane; gaseous sample injection; or thermal desorption.

Volatiles are swept out of the sampler 109 into the mass sensor 110 wherein the vapor phase molecules are ionized and fragmented, and the charged fragments are drawn to an integral ion detector. Monitoring the ion detector's output current as a function of mass to charge ratio (symbolized as m/z and colloquially shortened to just "mass" gives rise to a mass sensor response provided in the form of a mass spectrum. Because the ionization and fragmentation processes are extremely reproducible, even a complicated sample mixture produces a distinctive and repeatable mass sensor response. One or more of such mass spectra is then provided in a data matrix to the computer 111 for effecting, under the direction of a chemometrics software package, one or more multivariate analysis routines to process the data matrix. The results of the analysis can then be presented to the operator on the input output means 114 or stored in the storage means 112 for later retrieval.

Unlike traditional headspace gas chromatography instruments with mass selective detection (known as a HS/GC/MS system), the system 100 operates without a gas chromatograph and accordingly need not effect a separation of the volatile constituents. Headspace volatiles are transferred directly to the mass sensor 110, which typically gives rise to a single broad peak composed of all the volatile constituents in the sample. Because the mass spectrum of all these compounds is overlaid, one or more multivariate data analysis routines, in an instrument control and chemometrics software, are used to classify the sample.

The instrument control software and chemometrics software are used not only for carrying out the multivariate analysis but also for control of the system 100 and for the collection and management of data. Using software-based control routines which are tailored to coordinate the functions of the sampler 109 and the mass sensor 110, the operator can create a method which specifies the controlling instrument parameters and configures a run sequence for a set of samples.

When a set of samples has been analyzed, the individual mass spectrum patterns are automatically appended to a single file in preparation for multivariate data-processing. The full functionality of the control in the chemometrics software package is present in the background to provide access to additional tuning and signal processing features. The system 100 is designed to operate over a wide user-selectable mass range of 2 to 800 amu. For volatile components, a mass range of about 35 to 180 amu may be used to eliminate the effects of water or air on the integrity of the data.

Patterns of association exist in many data sets, but the relationships between samples can be difficult to discover when the data matrix exceeds three or more features. Exploratory data analysis can reveal hidden patterns in complex data by reducing the information to a more comprehensible form. Accordingly, the method and apparatus of the present invention implement a chemometric analysis so as to expose possible outliers and indicate whether there are patterns or trends in the data.

Chemometrics is considered herein the field of extracting information from multivariate chemical data using tools of statistics and mathematics. Chemometric tools are typically used for one or more of three primary purposes: to explore patterns of association in data; to track properties of materials on a continuous basis; and to prepare and use multivariate classification models. The algorithms in primary use in the art of chemometrics have demonstrated a significant capacity for analyzing and modeling a wide assortment of data types for an even more diverse set of applications.

Exploratory data analysis is the computation and the graphical display of patterns of association in multivariate data sets. The algorithms for this exploratory work are designed to reduce large and complex data sets into a set of best views of the data; these views provide insight into the structure and correlation that exist among the samples and variables in your data set. Exploratory algorithms, such as principal component analysis (PCA), which is also known as factor analysis, is designed to reduce large complex data sets into a series of optimized and interpretable views.

A Principal Components Analysis (PCA) algorithm is included as one of the multivariate analysis routines in the control and chemometrics software in the computer 111. In such an analysis, the composite spectrum of one sample becomes a data point on a three-dimensional PCA plot. The data point from similar samples cluster together on the plot. Principal components are considered "factors" in the plots. Samples that differ in their volatile components (due to composition, grade, impurity, manufacturing processes, etc.) will cluster in different locations on the three-dimensional PCA plot. One can then view sample clusters and outliers by simply rotating the three-dimensional plot on the computer display.

Principal Component Analysis (PCA) is designed to provide the best possible view of the variability in a multivariate data set. In addition, the intrinsic dimensionality of the data can be determined and, with variance retained in each factor and the contribution of the original measured variables to each, this information can be used to assign chemical meaning (or biological meaning or physical meaning) to the data patterns that emerge and to estimate what portion of the measurement space is noise. PCA is fundamentally similar to factor analysis or eigenvector analysis. It is a method of transforming complex data into a data said having a reduced dimensionality in which the most important or relevant information is made more obvious. This is accomplished by constructing a new set of variables that are linear combinations of the original variables in the data set. These new variables, often called eigenvectors or factors, can be thought of as a new set of plotting axes which have the property of being orthogonal (i.e., completely uncorrelated) to one another. In addition, the axes are created in the order of the amount of variance in the data for which they can account. As a result, the first factor describes more of the variance in the data set than does the second factor, and so forth. The relationships between samples are not changed in this transformation, but because the new axes are ordered by their importance (i.e., the variance they describe is a measure of how much distinguishing information in the data they contain), one can graphically see the most important differences between samples in a low-dimensionality plot.

Many applications require that samples be assigned to predefined categories, or "classes". This may involve determining whether a sample is good or bad, or predicting an unknown sample as belonging to one of several distinct groups. Accordingly, such classification may be performed in the control and chemometrics software operable in system 100 for the computation and the graphical display of class assignments based on the multivariate similarity of one sample to others. The algorithms for this classification work are designed to compare new samples against a previously analyzed experience set. A classification model is used to predict a sample's class by comparing the sample to a previously analyzed experience set, in which categories are already known. K-nearest neighbor (KNN) and soft independent modeling of class analogy (SIMCA) are primary chemometric techniques selectable for this purpose. In this manner, a chemometric system can be built that is objective and thereby standardize the data evaluation process.

Reliable classification of unknown samples is the ultimate goal of the SIMCA analysis. Examination of the variance structure within each class allows one to understand the complexity of a category, and use this information to further refine the effectiveness of the training data. SIMCA has the ability not only to determine whether a sample does belong to any of the. predefined categories, but also to determine that it does not belong to any class. Class predictions from SIMCA fall into three possible outcomes: 1. The sample is properly classified into one of the predefined categories 2. The sample does not fit any of the categories 3. The sample properly fits into more than one category. One can place confidence limits on any of the outcomes as well, because these decisions are made on the basis of statistical "F" tests.

Further information concerning exploratory data analysis may be found in Massart, D. L.; Vandeginste, B. G. M.; Deming, S. N.; Michotte, Y.; and Kaufman, L; Patel is a the (Elsevier Amsterdam, 1988). Further information concerning classification analysis may be found in Forina, M. and Lanteri, S.; "Data Analysis in Food Chemistry" in B. R. Kowalski, Ed., *Chemometrics, Mathematics and Statistics in Chemistry* (D. Reidel Publishing Company, 1984), 305349. Sharaf, M. A.; lllman, D. L.; and Kowalski, B. R.; *Chemometrics* (Wiley: New York, 1986). Further information concerning multivariate data analysis in general may be found in Chatfield, C., and Collins, A. J. : *Introduction to multivariate analysis*(1980); Hö̈skuldsson, Agnar: *Prediction Methods in Science and Technology*, Thor Publishing Denmark (1996); Jackson, J. E. :*A user's guide to principal components*, John Wiley (1991); Jollife, I. T. : *Principal component analysis*, Springer-Verlag (1986); Martens, H., and Naes, T.: *Multivariate calibration*, John Wiley (1989).

Accordingly, the computer 111 employs a preferred embodiment of a comprehensive chemometrics modeling software package that is commercially available in the form of "Pirouette for Windows" from Infometrix, Inc., of Woodinville, WA. Prediction, classification, data exploration and pattern recognition methods are operable in this software package. The preferred software package also includes an interface that facilitates interacting with raw and processed data. Another useful chemometrics modeling software packages is commercially available from UMETRI, of Umea, Sweden, which produces a graphically-oriented software known as "SIMCA-P" that is useful for effecting Design Of Experiments (DOE), Multivariate Data Analysis (MVDA), and modeling.

Turning now to FIGS. 2–14, it will be understood that the system 100 may be operated according to a preferred embodiment of a programmable analytical method (hereinafter, analytical method 200) that is implemented in the computing means 111 with use of one or more of the Multivariate Data Analysis (MVDA) techniques described herein, for classification of a plurality of complex samples and for identification of an anomalous sample component in a selected one of the complex samples 108. For the purposes of illustrating an exemplary set of data results, FIGS. 3–14 show the results of successive stages of an experimental analysis of samples which were performed, according to the teachings herein, on an HP 4440A Chemical Sensor, equipped with the comprehensive chemometrics modeling software package known as "Pirouette 2.5 for Windows" from lnfometrix, Inc., of Woodinville, WA.

Figure 2:
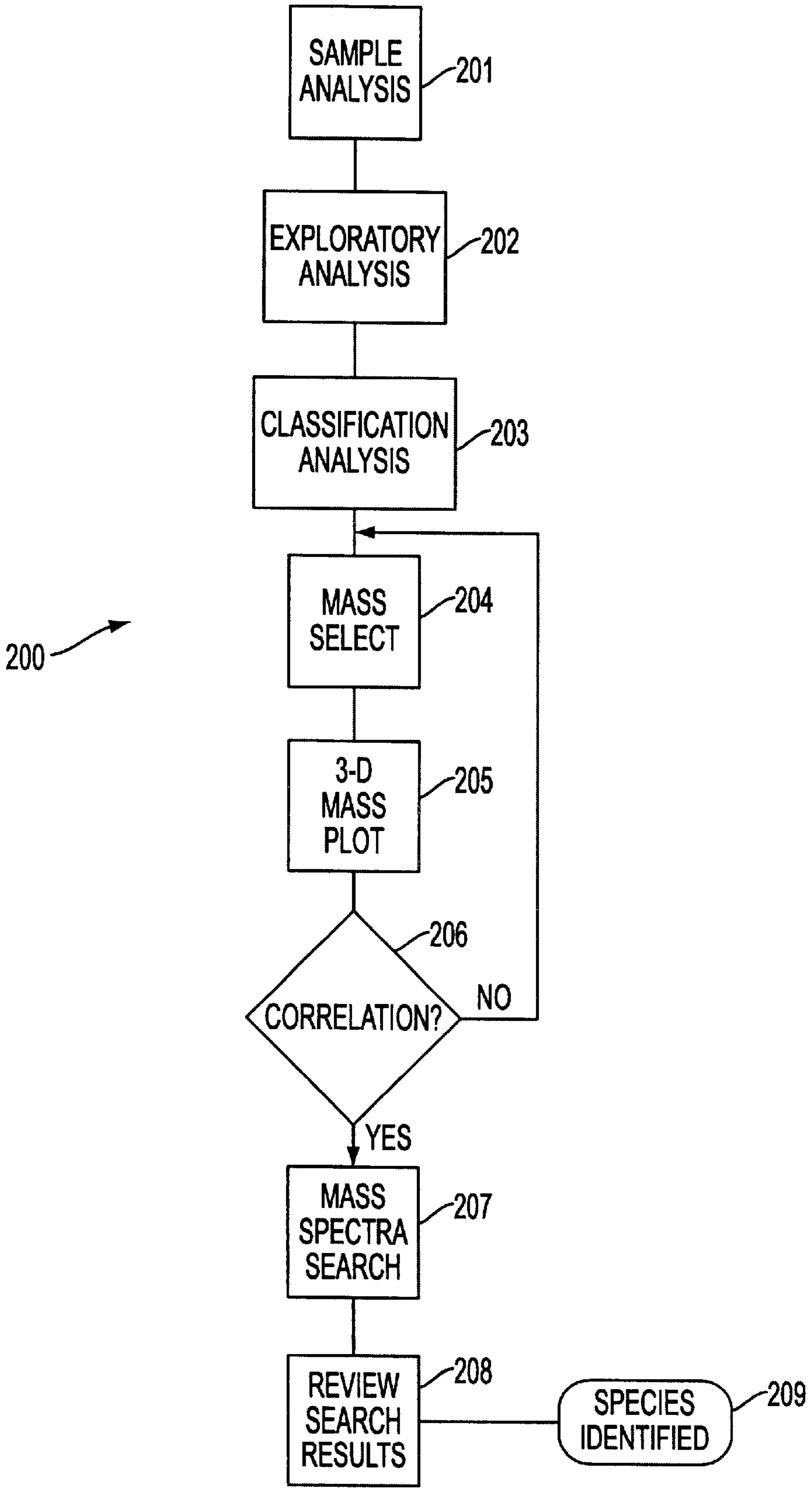
FIG. 2 is a block diagram of a method for identification of an anomalous component in a complex sample that is subject to analysis in the mass sensor system of FIG. 1.

As illustrated in FIG. 2, the analytical method 200 begins with a first step 201 in which a plurality of samples 108 are provided to the sampler 109 such that volatiles are swept out of the headspace of each sample into the mass sensor 110, wherein the vapor phase molecules are ionized and fragmented, and the charge fragments are drawn to an ion detector. A mass spectrum for each sample 108 is derived from the ion detector's current as a function of mass to charge ratio (m/z). A mass spectra representing the plurality of samples is compiled and presented to the computer 111 in a data matrix for a multivariate data analysis performed according to steps 202–205.

Figure 3:
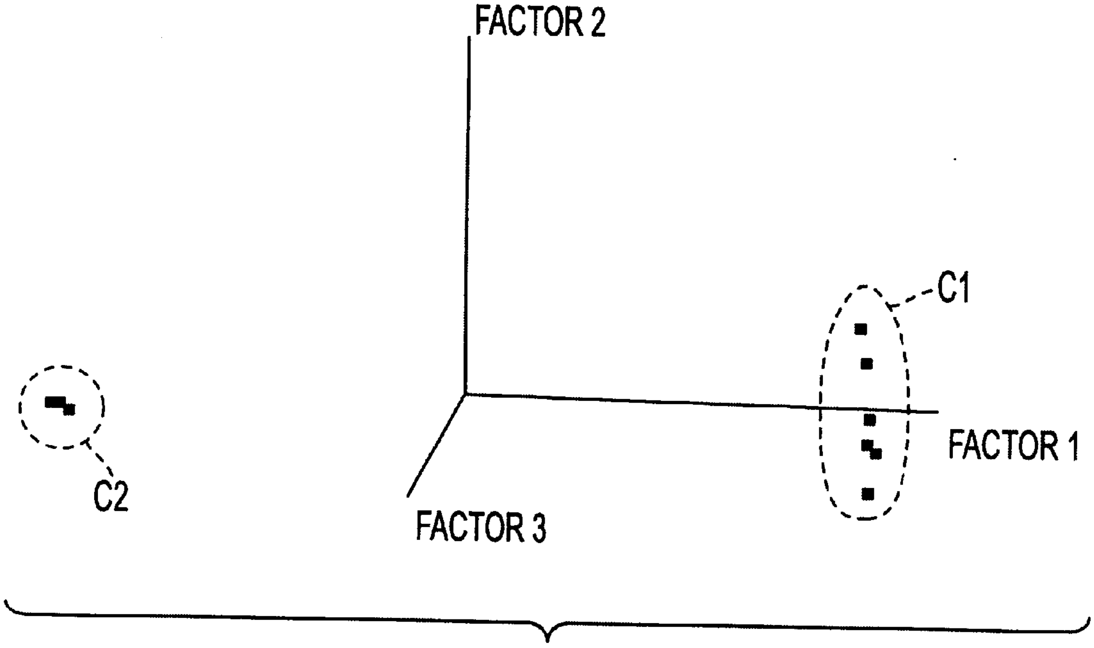
FIG. 3 is a graphical representation of the results of an exploratory analysis of principal components associated with an experimental sample that was subject to analysis in the mass sensor system of FIG. 1, wherein three principal components are considered as factors in a principal component analysis (PCA).

In step 202, an exploratory analysis of the data matrix is first performed. Pre-processing of the data matrix may be implemented as necessary (such as mean centering, autoscaling, and normalization of the data) such that a principal component analysis (PCA) technique may then be applied by the chemometrics software to the data matrix using a plurality of sets of selected principal components. As illustrated in FIG. 3, an exemplary set of three selected principal components may be selected for application to the data matrix supplied from the sample analysis in step 201 (wherein each principal component is considered a reliable "factor" in the ensuing PCA technique for determining whether or not the respective sample exhibits an expected or desirable composition, e.g., whether the sample is "pure" or "impure"). FIG. 3 illustrates a first duster C1 of points which appear to be consistent with a desired or expected sample composition, and a second cluster C2 which exhibits sufficient variance from the first cluster C1 such that the second cluster C2 is indicative of at least one sample that exhibits a differentiated, or anomalous, composition. Accordingly, the samples represented in the second cluster C2 would then be considered to be anomalous; at least one of such samples may then be subjected to the method steps described hereinbelow for identification of the composition of the differentiating sample component (e.g., a compound or chemical) that has caused such sample(s) to be considered anomalous.

Figure 4:
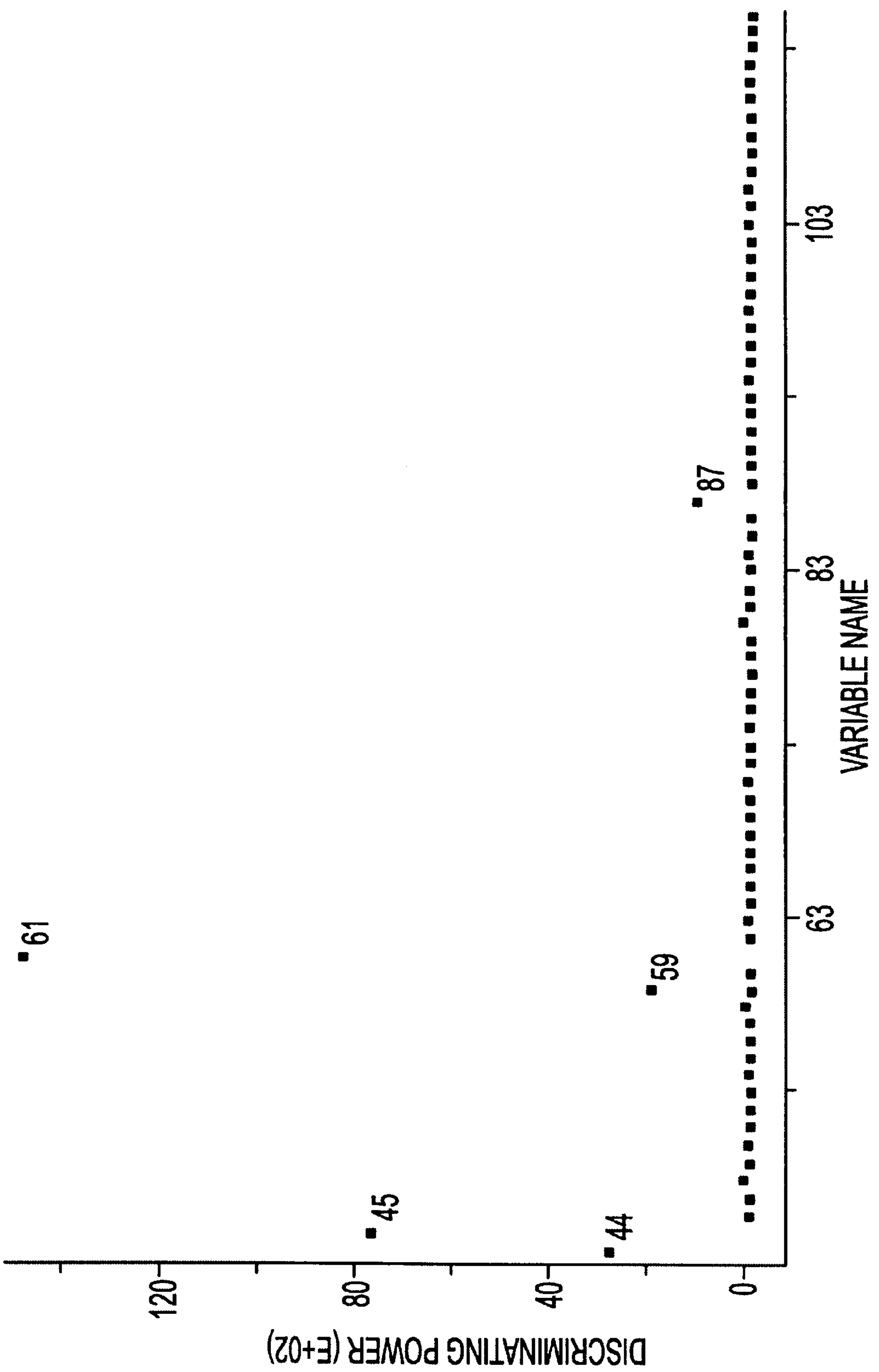
FIG. 4 is a graphical representation of the results of a classification analysis, illustrating a plot of discriminating power versus m/z ratio values, wherein the classification analysis is performed according to a soft independent modeling of class analogy (SIMCA) analysis.

In step 203, and as illustrated in FIG. 4, a classification method analysis is performed using the related masses that were distinguished in the foregoing exploratory data analysis. Preferably the classification method analysis is performed according to a soft independent modeling of class analogy (SIMCA) technique, wherein the masses exhibiting a high discriminating power are classified according to a two-class comparison so as to distinguish the masses of the differentiating compound or compounds that appear within each set of two classes. (When more than two classes are found in the data matrix, the comparison is used to compare one unknown group to a standard collection of known compounds that have been used to develop a training set.) For example, for a given variable, comparing the average residual variance of each class fit to all other classes, and the residual variance of all classes fitted to themselves, provides an indication of how much a variable will discriminate between a "correct" and an "incorrect" classification. A mass associated with a low value (i.e., less than approximately 1) of discriminating power indicates low discrimination ability is associated with that particular mass, whereas a mass associated with a value much larger than 1 implies that the particular mass exhibits a high discrimination ability. As indicated in step 204, and as illustrated in FIG. 4, one may conclude that certain masses are distinguishable as exhibiting of a high discriminating power. These masses are then selected (e.g., mass 44, mass 45, mass 59, mass 61, and mass 87) for correlation in the following step 205.

Figure 5:
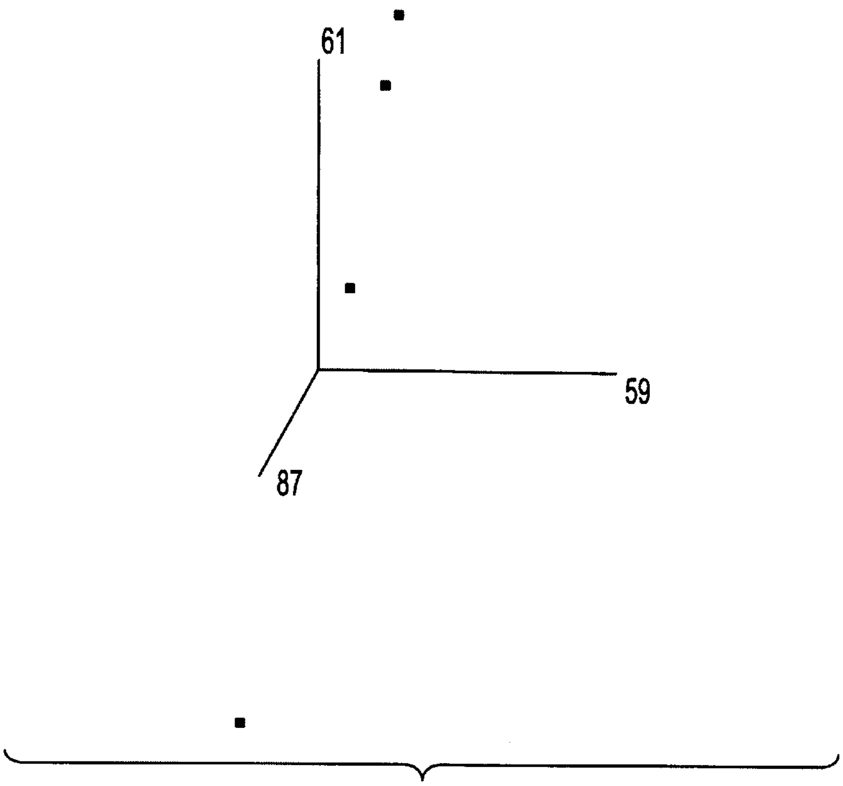
FIGS. 5–9 are graphical representations of three-dimensional mass correlation plots that result from analysis of the data matrix according to the masses selected in the discriminating power output from the SIMCA-based classification analysis of FIG. 4.
Figure 6:
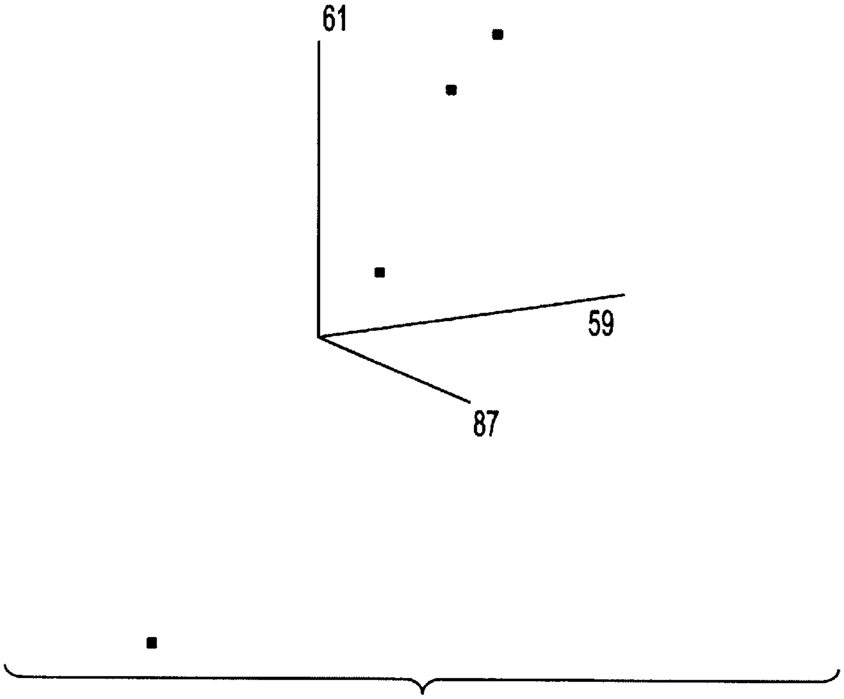

In step 205, and as illustrated in FIGS. 5–9, analysis of the selected masses using a respective mass correlation analysis will yield a respective three-dimensional mass correlation plot. FIGS. 5 and 6, for example, are graphical representations of a three-dimensional mass correlation plot wherein the mass correlation plot is rotated around the axis associated with mass 61.

Figure 7:
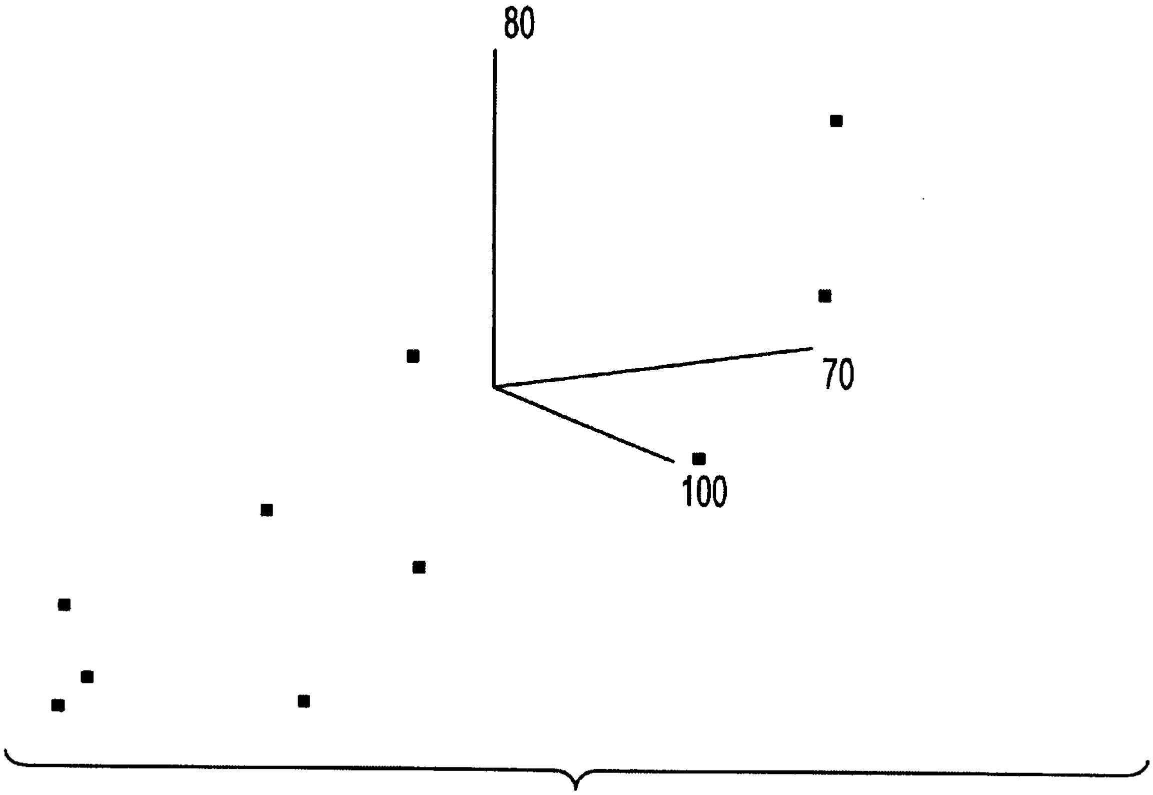

If certain masses represent molecules that originate from one sample component (e.g., mass 59, and mass 61), the points will correlate along two of the three axes, as illustrated in FIGS. 5 and 6. If the selected masses are not related, as illustrated in FIG. 7, the points will be observed to be scattered (e.g., the points illustrated according to axes representative of mass 70, mass 80, and mass 100).

Figure 8:
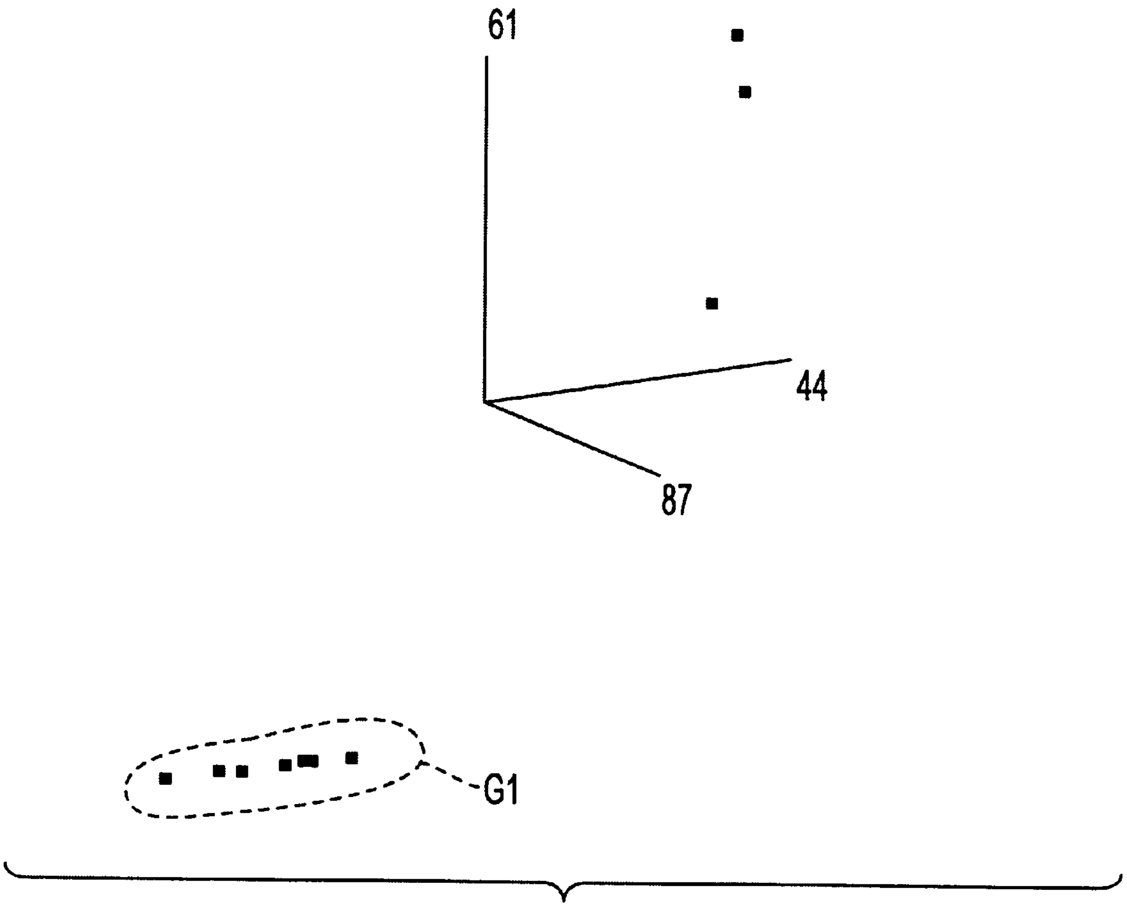
Figure 9:
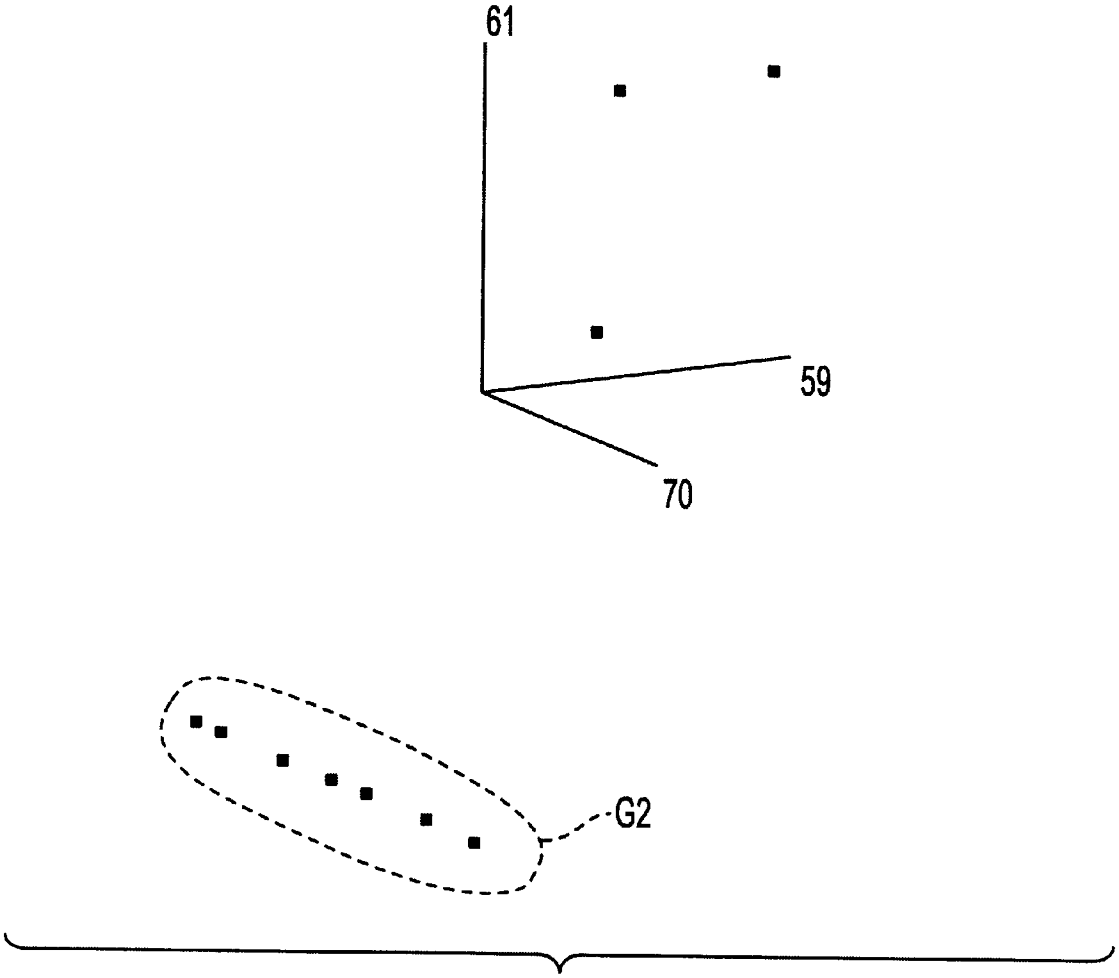
Figure 10:
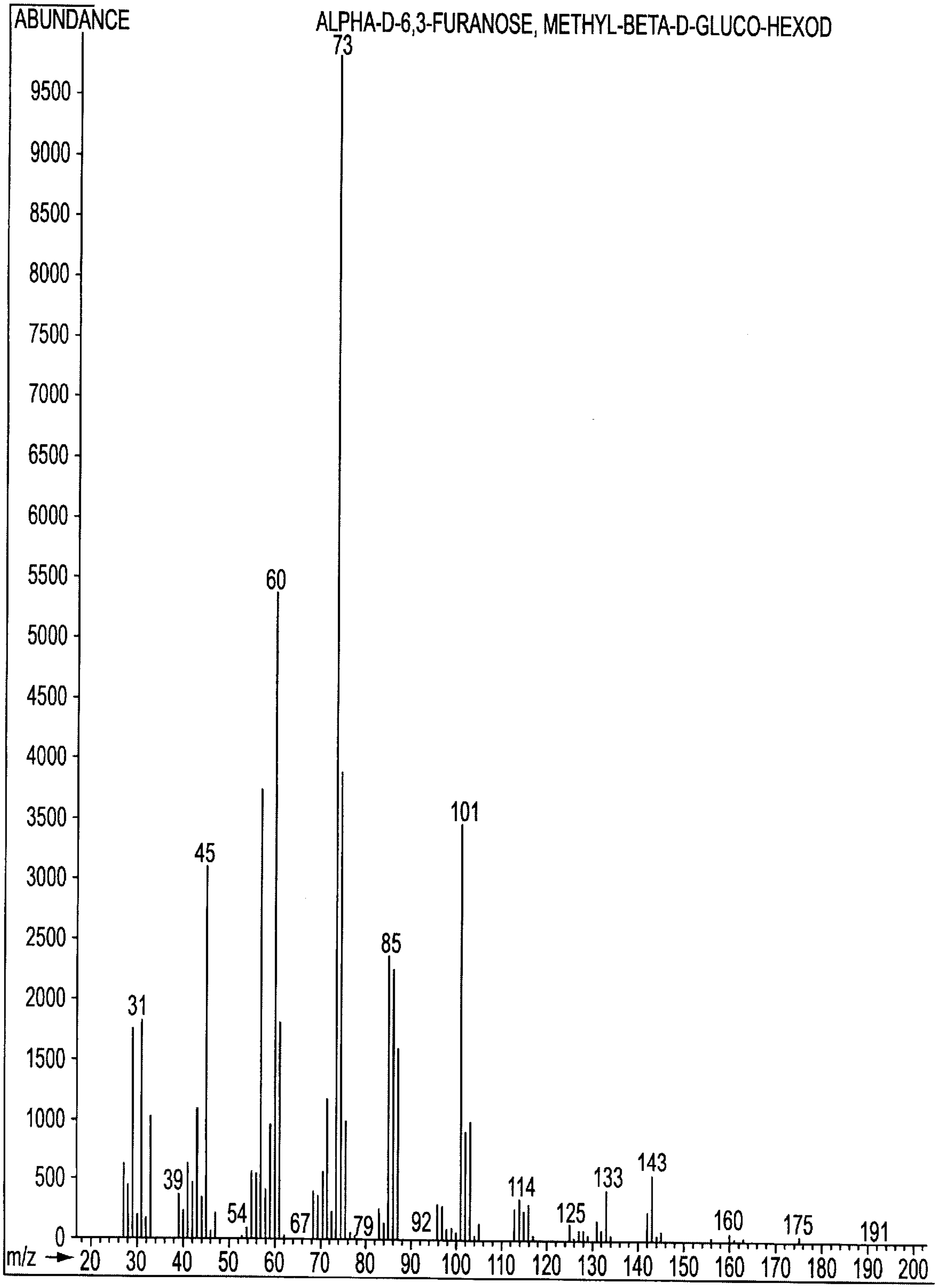
FIGS. 10–14 are graphical representations of respective plots of abundance versus m/z ratios realized in a search for a differentiating compound.
Figure 11:
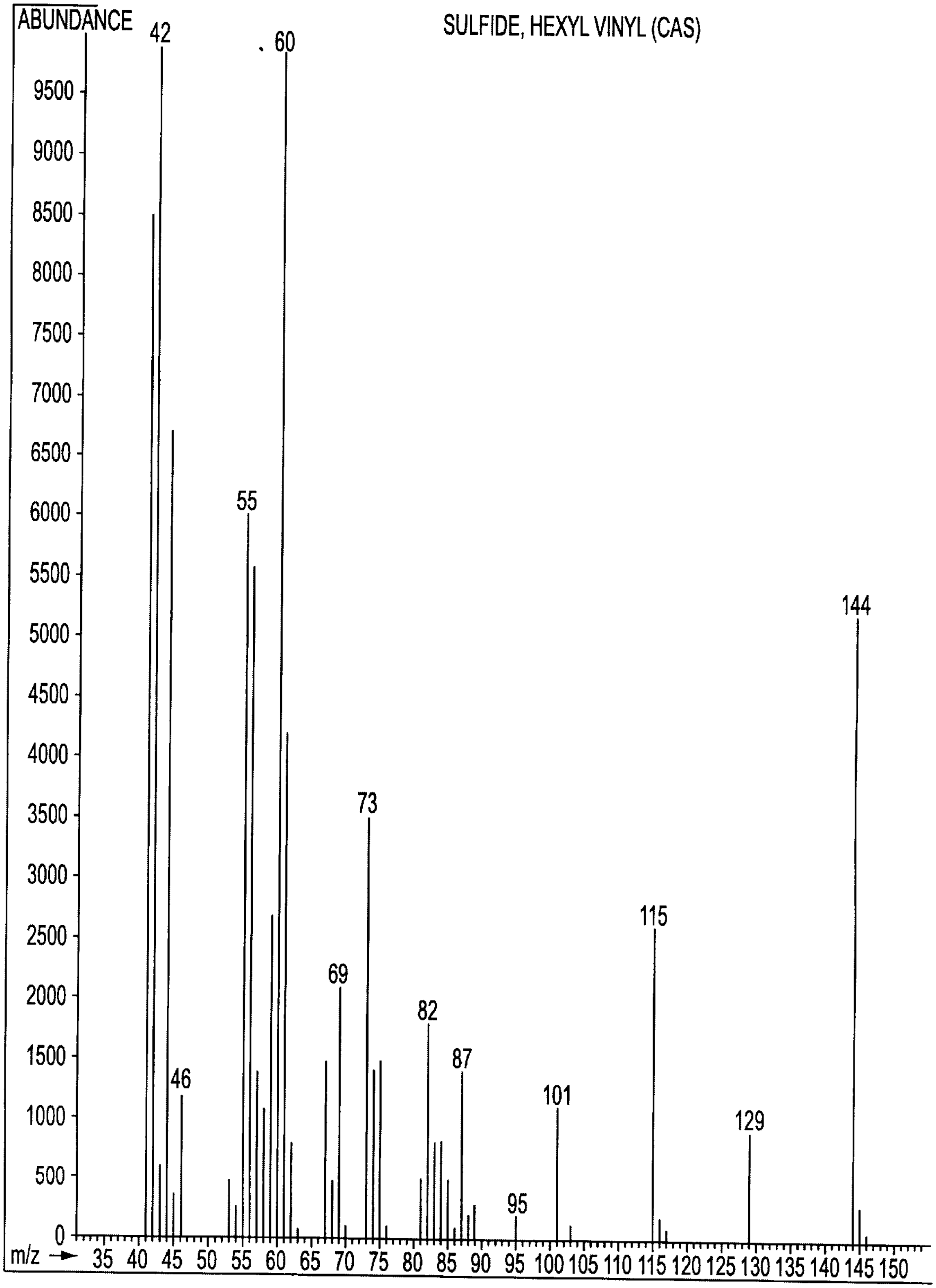
Figure 12:
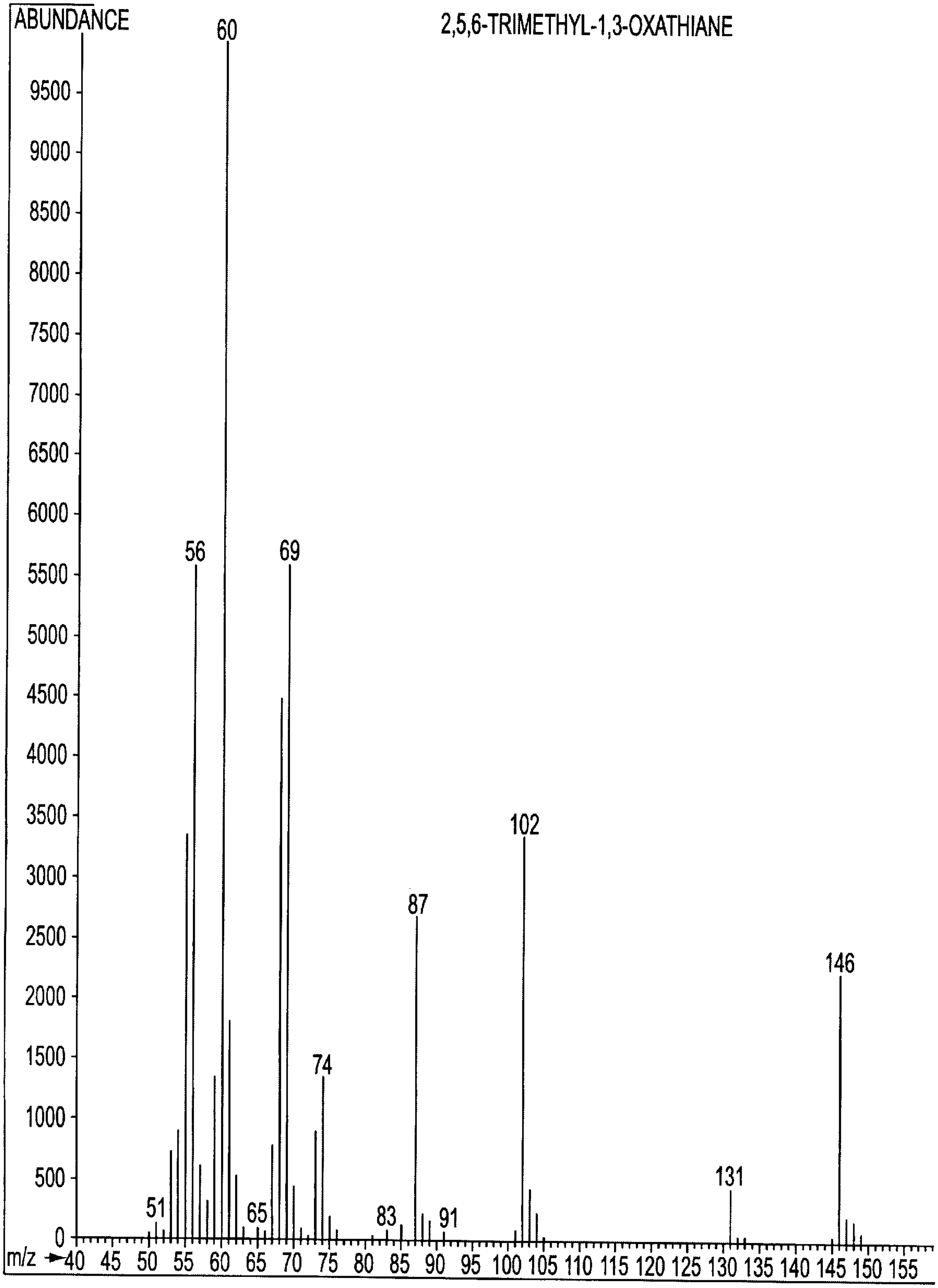
Figure 13:
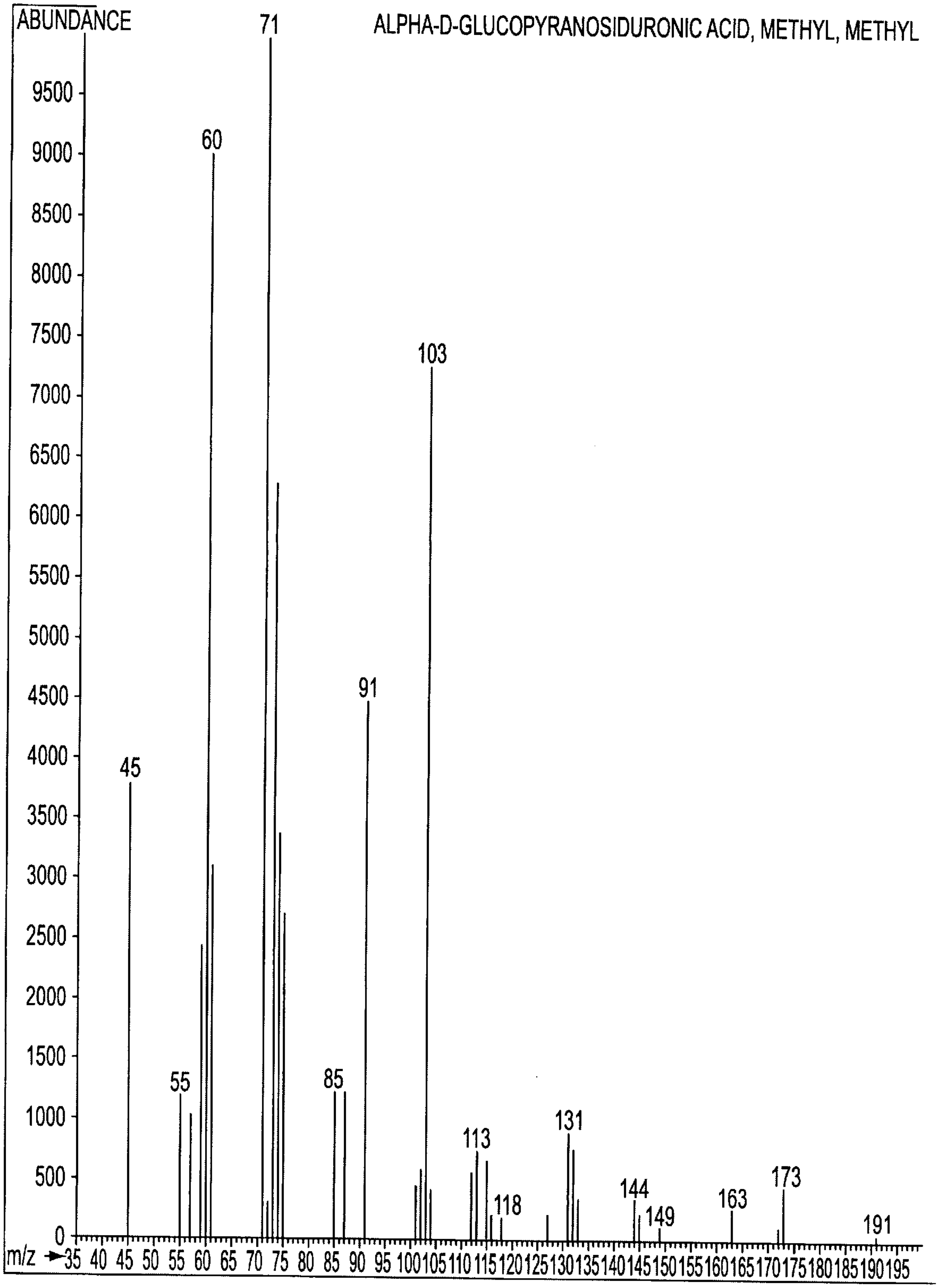

Rotation of the plots in FIGS. 5 and 6 allows one to conclude that two of the masses illustrated therein (i.e., mass 59 and mass 61) are correlated because all of the plotted points in the respective three dimensional mass correlation plot appear to be arranged linearly (that is, appear to be aligned along an imaginary straight line). In contrast, reference to FIGS. 8 and 9 illustrate at least two uncorrelated masses (mass 44 and mass 70). FIG. 8 illustrates only a portion of the plotted points (i.e., a group of points G1) appear to be arranged linearly (that is, appear to be aligned along an imaginary straight line) and such linear arrangement is parallel to one of the plot axes (that is, parallel to the axis corresponding to mass 44.) From this observation one may conclude that the associated mass (mass 44) is uncorrelated with the remaining two masses illustrated in the plot (i.e., mass 87 and mass 61 in FIG. 8.) FIG. 9 illustrates only a portion of the plotted points (i.e., a group of points G2) which appear to be arranged linearly and such linear arrangement is parallel to one of the plot axes (that is, parallel to the axis corresponding to mass 70.) From this observation one may conclude that the associated mass (mass 70) is uncorrelated with the remaining two masses illustrated in the plot (i.e., mass 59 and mass 61 in FIG. 9.) Accordingly, a thorough review of FIGS. 4–9 allows one to identify at least three related masses: mass 59, mass 61, and mass 87.

In step 206, when a group of data points is observed to be correlated, those mass values are retained for use in step 207. However, if no such correlation is detected, the method 200 returns to step 204 for selection of a new group of masses that are indicative of a high discriminating power.

In step 207, assuming at least three correlated masses are now identified, the respective mass values are entered into a parametric retrieval tool linked to a mass spectrum library provided in the software package. In this step, a mass spectra search is performed in order to identify candidate mass spectra that are associated with the correlated masses and which are potentially indicative of the differentiating sample component.

Figure 14:
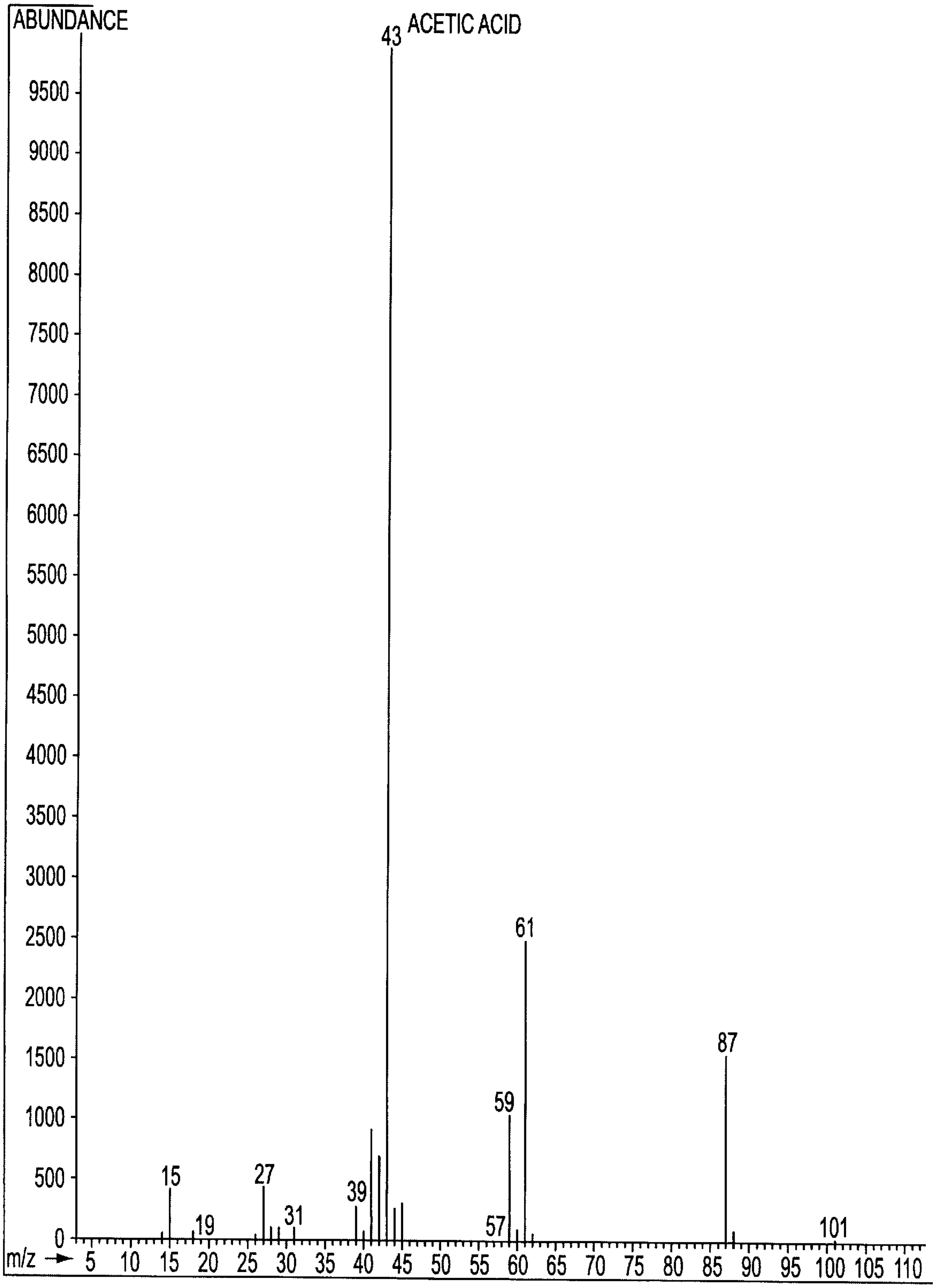

In step 208, the candidate mass spectra obtained in step 207 are reviewed so as to identify the differentiating sample component associated with the selected masses that were determined in step 206. In step 209, and as illustrated in FIGS. 10–14, all but one of the candidate mass spectra have the appropriate set of related major peaks. Accordingly, the differentiating sample component (i.e., a chemical or compound) may be identified, as illustrated in FIG. 14. In the experimental data results illustrated in FIGS. 10–14, the differentiating sample component is identifiable in FIG. 14 as acetic acid.

Although certain embodiments of the present invention have been set forth with particularity, the present invention is not limited to the embodiments disclosed. Accordingly, reference should be made to the appended claims in order to ascertain the scope of the present invention.

What is claimed is:

1. A method for identification of an anomalous sample component in a complex sample, wherein the complex sample is provided in a group of complex samples, comprising the steps of:

providing the group of complex samples to a sampler;

sampling a quantity of each of the complex samples so as to provide a respective quantity of vapor phase molecules of the respective complex sample to a mass sensor;

deriving a mass spectrum representative of the masses in each of the quantities of complex samples analyzed by the mass sensor, so as to generate a plurality of mass spectra;

providing the plurality of mass spectra to a computer in a data matrix;

performing an exploratory data analysis of the data matrix using at least one set of principal components;

performing a classification method analysis of the data matrix using a soft independent modeling of class analogy (SIMCA) technique, wherein the masses exhibiting a high discriminating power are selected;

performing, with use of each of the selected masses that exhibit a high discrimination power, a mass correlation analysis with respect to each selected mass so as to determine a set of at least three correlated masses;

comparing each of the three correlated masses to mass spectra in a mass spectra library so as to identify at least one candidate mass spectrum that is associated with the correlated masses and which is potentially indicative of a respective anomalous sample component;

reviewing the candidate mass spectrum to select the anomalous sample component that is associated with the correlated masses; and identifying the selected anomalous sample component.

2. The method of claim 1, further comprising the step of performing pre-processing of the data matrix.

3. The method of claim 1, wherein the step of performing an exploratory data analysis of the data matrix further comprises the step of applying a principal component analysis (PCA) technique to the data matrix.

4. The method of claim 1 wherein the step of performing a classification method analysis is performed according to a two-class comparison so as to distinguish the masses of the differentiating compound that appear within each set of two classes.

* * * * *